Figure 1:
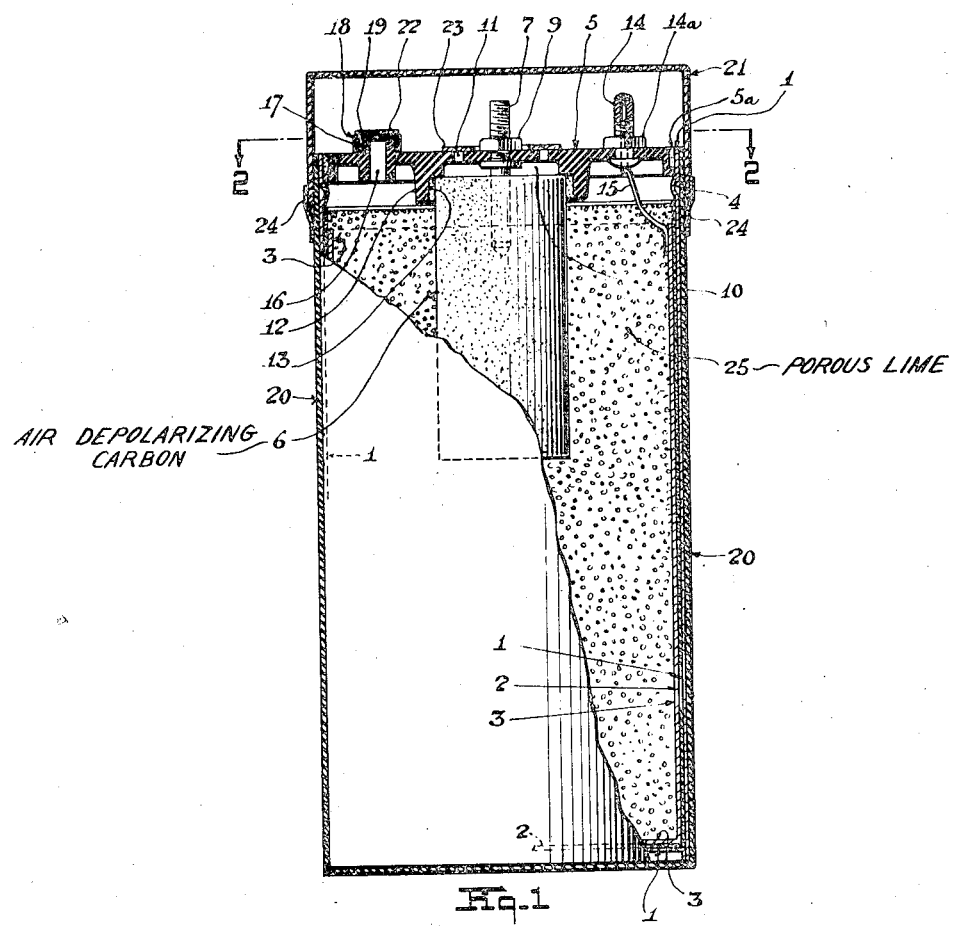

Oct. 5, 1948.    LE ROY S. DUNHAM ET AL    2,450,472
ALKALINE PRIMARY BATTERY
Filed March 15, 1947

INVENTORS
Leroy S. Dunham
Ernest O. Jegge
By Henry Lanahan

Patented Oct. 5, 1948

2,450,472

UNITED STATES PATENT OFFICE 2,450,472

ALKALINE PRIMARY BATTERY

Le Roy S. Dunham, East Orange, and Ernest O. Jegge, Glen Ridge, N. J., assignors to Thomas A. Edison, Incorporated, West Orange, N. J., a corporation of New Jersey Application March 15, 1947, Serial No. 734,956

10 Claims. (Cl. 136—164)

This application is a continuation-in-part of our pending application Serial No. 570,390, filed December 29, 1944 and entitled Electric battery, and now being abandoned upon the filing of this application.

The present invention relates particularly to primary batteries employing a caustic alkaline electrolyte, a zinc anode and an electrolyte-regenerating material. In some respects, although not limitatively, the invention relates to alkaline primary batteries of the deferred-action type.

In alkaline primary batteries of the zinc-anode type the electrolyte is gradually exhausted by chemical combination with the zinc anode. As a means of releasing the electrolyte which is so consumed, there are added one or more regenerating materials such as the alkaline earth compounds of calcium, barium or strontium, or different magnesium compounds, zeolite, bentonite, etc. Of these materials the calcium compound, lime, is the most commonly used. Since lime is particularly suitable for this purpose, we herein describe our invention in terms of this typical and preferred compound but without intending any unnecessary limitation thereto.

Lime has not heretofore been used to full effectiveness for regenerating alkaline electrolyte in primary batteries because of a failure to maintain contact between the electrolyte solution and the entire mass of the lime as the regenerating reaction proceeds. This failure has been due largely to the formation on the lime of surface layers of the reaction product, calcium zincate, which cause a gradual sealing off of large portions of the lime from contact with the electrolyte solution. Probably the best method heretofore proposed for overcoming this difficulty is disclosed in the Heise, et al. Patent No. 2,180,955, which is to add to the lime a cellulose fluff or other wick-like material which will by capillary attraction provide the lime with electrolyte-permeable paths. While this proposal is an improvement, it has the disadvantage that a capillary formed by a wick-like material does not provide a path for adequate circulation of the electrolyte; moreover, the cellulose fluff or other like material has a tendency to segregate from the lime and to fail then to accomplish the very purpose for which it is added.

We have found that electrolyte-regenerating materials can be provided in a porous form having multitudinous, relatively-large open spaces running therethrough, and that these materials can moreover be provided so that they have substantial structural strength and permanence to maintain substantially the open texture of the original mass of material during the action of the cell. Upon using a regenerating material having such open texture, we obtain a very great area of surface contact between the electrolyte solution and the regenerating material per unit of volume of that material, and we also provide open paths unimpeded by any foreign material for free flow and diffusion of the electrolyte solution through the regenerating material to enable the zinc-anodic reaction products to be carried from the zinc anode throughout the mass of the regenerating material; also, we are enabled to provide effectively very large quantities of regenerating material in a given size of battery. By this advance in the art we are enabled to realize a markedly greater ampere-hour capacity from alkaline-electrolyte primary batteries per units of volume, weight and cost than has been heretofore obtained.

It is accordingly an object of our invention to provide alkaline-electrolyte regenerating materials in more effective physical form, and further to provide masses of such material having very open texture adapted to maintain open paths therein during reaction of the entire quantity of the material with the electrolyte-exhaustive substances.

It is another object to provide a porous regenerating material having a minor proportion of an ingredient dispersed therethrough to give the material increased structural strength and permanence so that it will hold substantially its shape during reaction with the electrolyte-exhaustive substances.

It is another object to provide porous regenerating materials having sufficient physical contact with the electrolyte solution to enable the cell container to be completely filled with the regenerating material and the electrolyte solution to be confined solely to the pores and open spaces of that material. Further it is an object to provide a primary battery whose ampere-hour capacity is substantially independent of the quantity of liquid electrolyte.

It is another object to provide a regenerating material comprised predominantly of lime, which has a porous granular structure adapted to maintain interstices between granules during their action with the electrolyte-exhaustive substances.

Another object is to provide a primary battery which has a higher ampere-hours capacity per unit of volume than has been heretofore obtained.

Another object is to provide a battery having high ampere-hours capacity per unit of volume together with the ability to discharge large currents at cold temperatures.

Another object is to improve the action of alkaline primary batteries employing electrolyte-regenerating materials by using therein electrolytes having less solution strength than is normally used.

A still further object is to provide a highly efficient primary battery of the zinc-anode alkaline-electrolyte type which has stable and dependable operating characteristics.

Other objects and features of our invention will be apparent from the following description and the appended claims.

Figure 2:
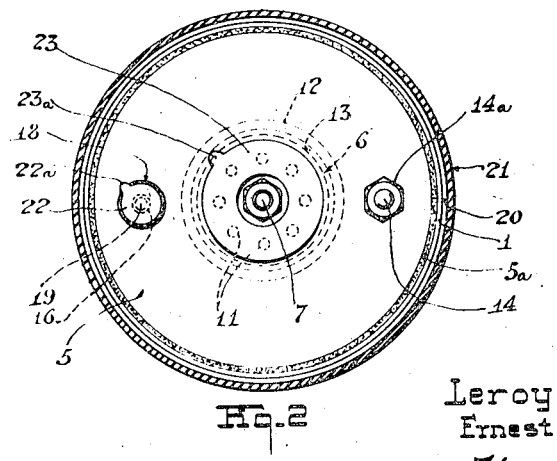

In the description of our invention reference is had to the accompanying drawings, of which:

Figure 1 is an elevational view, partly broken away, of a primary battery illustrating our invention; and Figure 2 is a top view of this battery but with the lid of the outer container removed.

The battery shown in the accompanying figures has a liquid-tight container 1 suitably cylindrical in shape which may be made of metal such as stainless steel. This container may, for instance, have the size of a No. 6 (2½" x 6") dry cell. The container is suitably lined with insulation 2 such as of hard rubber or suitable plastic, for example, vinyl chloride or polystyrene. Adjacent to the insulation 2 is a zinc anode 3 (negative electrode) which may have a cylindrical shape as shown. At the center of the battery there is a cathode 6 (positive electrode) which may be of copper oxide, manganese dioxide, mercuric oxide, etc. or of any suitable depolarizing material such as porous carbon, it being shown as of the last-mentioned material by way of illustration.

The container is closed at the top by a cover 5. This cover seats on an inwardly-turned bead 4 of the container and is sealed liquid-tight to the container by a sealing material 5a. In the cathode there is anchored a metal axially-extending stud 7. This stud is mounted on the central portion of the cover and is secured thereto by an external nut 9. In the bottom side of the cover above the cathode, there is a circular recess 10 and from this recess there is a series of breathing holes 11 leading through the cover to expose the top face of the cathode to the atmosphere. Under pressure obtained by tightening the nut 9, the top rim portion of the cathode is clamped tightly against the wall portion of the cover which surrounds the recess 10. However, to form a liquid-tight seal of the cathode to the cover, the cover is provided with a depending annular flange 12 which is spaced radially from the cathode, and the annular space between the cathode and the flange is filled with a sealing material 13.

The stud 7 serves as the positive terminal for the battery. The negative terminal is a bolt 14 mounted on the cover and connected by a conductor 15 to the zinc anode 3. The cover has an opening 16 through which water or an electrolyte is added to the battery. This opening is surrounded by an upstanding cylindrical portion 17 of the cover to which is secured a plug or cap 18 having a small vent hole 19 to allow escape of gases during the action of the battery.

The metal container 1 may have a surrounding carton 20, made for example of cardboard, which serves to insulate the container from ground during the use of the battery. This carton may have a removable cap or lid 21 for protecting the top protruding elements of the battery from damage during shipping or storage.

The battery may be provided initially with a dry caustic alkali so that it will be in a deferred state that is rendered active when water is added. To preserve the dry caustic alkali during shipping and storage before the battery is put into use, the container 1 is sealed by pasting strips 22 and 23 of suitable adhesive tape over the vent hole 19 and breathing holes 11, these strips having respective tabs 22a and 23a so that they can be easily removed when the battery is to be put into use. Additionally, the carton 20 and lid 21 may be suitably impregnated so as to be airtight, and the lid may be sealed to the carton by a strip 24 of adhesive tape.

In the container 1 there is provided a mass 25 of regenerating material comprised predominantly of porous lime. The lime may be initially in either the oxide or hydroxide form, but the hydroxide form is preferred. The action of the lime in regenerating the caustic alkaline electrolyte, assuming the electrolyte to be a solution of sodium hydroxide, is as follows: During action of the battery the sodium hydroxide combines gradually with the zinc anode to form sodium zincate according to the formula

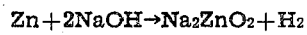
$$Zn + 2NaOH \rightarrow Na_2ZnO_2 + H_2$$

This sodium zincate remains in solution and is an electrolyte-exhaustive substance because it contains sodium at the expense of the electrolye. The lime however combines chemically with the sodium zincate according to the formula

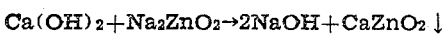
$$Ca(OH)_2 + Na_2ZnO_2 \rightarrow 2NaOH + CaZnO_2 \downarrow$$

In this reaction the sodium of the sodium zincate is replaced by calcium to produce calcium zincate, and the sodium goes back with the hydroxyl radical (OH) to reform sodium hydroxide.

We have found that this regenerating reaction process is very greatly expedited, and is maintained until substantially all of the lime is used up, if the lime is not merely porous but has relatively large open paths running therethrough which are unimpeded by any foreign material. We believe the high efficiency which we obtain in regenerating the electrolyte is due to the large area of contact which the electrolyte solution has with such porous lime mass and the freedom which the electrolyte solution has to diffuse and carry the anodic reaction products through the lime mass; also, we find that the maintenance of efficient regenerating action until all of the lime is spent is due largely to the use of lime having very open texture since lime of such physical form serves as a starting open-mesh framework on which the calcium zincate will build and expand without closing major pores and paths in the lime mass.

Lime of the physical character above described is realized very practically by providing it as a loose mass of porous granules. Preferably, the granulating process is carried out as follows: To a mass of dry, powdered, hydrated lime there is added enough water to form a damp mixture but not a paste. This mixture is then forced through a coarse screen to form granules and the granules are next dried in heated air. These granules are very porous. Typically, they are made of a size between 8 and 16 mesh. In providing a cell of the deferred-action type, we preferably use dry caustic alkali in granular form, say between 12 and 16 mesh, and mix this granular alkali with the granular lime. It is to be noted however that the granular size of the lime and alkali may be varied and that the particular sizes here given are merely typical for the size of cell herein illustrated.

When a mass of these lime granules are placed in the battery, the interstices between the granules provide open paths for unimpeded flow of electrolyte through the mass to individual granules, and the pores in the granules provide access to all the lime of each granule. Also, in a deferred-action type of cell wherein the dry caustic alkali is mixed with the granular lime the latter serves to hold the caustic alkali in a dispersed phase while providing open paths for ready contact of the liquid with the individual alkaline granules when water is added to the battery.

It is to be noted that as a minimum requirement, the lime granules need have only so much strength as to be able to withstand necessary handling and to be able to stand up against the liquid electrolyte during early stages of service of the battery. This is because in the regenerating reaction process there is a gradual conversion of the lime to calcium zincate, leaving a gradually harder and more permanent mass without changing substantially the physical character of the lime mass, since the reaction takes place at the lime without physically displacing the lime other than to cause a slight consolidation of the granules and knitting together at their adjacent points. This is evidenced by the fact that when the lime is all spent, the resultant mass has a unitary rock-like character provided yet in the main with the interstices which were between the granules of the original mass.

It is found that lime granules formed as above described do have sufficient strength for efficient practical use in carrying out our invention. It is believed the strength of these granules is due to some combination of the lime with carbon dioxide of the atmosphere, following the moistening of the lime in the granulating process, to produce some calcium carbonate as a bonding agent. Calcium carbonate has the desirable characteristic of being a structurally hard material which is permanent for the purpose at hand in that it is not soluble in caustic alkali nor reactable with the caustic alkali or electrolyte-exhaustive substances; also, it has the desired property of tending to be dispersed through the lime granules. However, in order to secure yet additional strength we preferably mix a suitable addition agent with the lime when the lime is granulated, which will react with a small portion of the lime to produce a hard, permanent material. Since this material tends to be well distributed through the lime it provides each granule with a permanent skeleton-like framework. A preferred such agent is calcium chloride. This chloride is dissolved in water in approximately the ratio of 100 grams of the chloride to one liter of the water and the water solution of the chloride is then used as the moistening agent for the lime when the lime is granulated. It may be noted that calcium chloride is a crystalline solid which acts as a binding agent even though it does not combine with the lime; however, we believe its more permanent strengthening effect arises from a chemical combination with the lime to produce an oxychloride cement. Other inorganic agents which may be used are sodium zincate, silicate of soda, or any other materials which have a permanent cementing effect. Also, organic chemicals may be used such as the synthetic resins including polystyrene, polyethylene, the polyvinyl resins, etc. In the granulating process dilute solutions of these resins may be added as the dampening agent. Later, as the granules are dried, the solvent evaporates leaving the lime very porous and provided with a skeleton of residual resin having a permanent form which is not harmfully attacked by the electrolyte solution.

It is found that on using porous lime having a very open texture as here described, the lime zincate reaction is so expedited and maintained during action of the battery that we may completely fill the battery container with the granular lime and provide only so much electrolyte solution as may be contained by the interstices and pores of the lime mass. We are thus able to provide a maximum volume of solid active ingredients in a given sized battery to maintain a maximum possible ampere-hour capacity per unit of volume of the battery. We do therefore preferably completely fill the container with the lime as illustrated in Figure 1; however, it will be understood that complete filling is done only so as to utilize our invention to its maximum effectiveness, and no unnecessary limitation thereto is intended.

Experiment has shown that marked advantages in cell performance may be obtained by using in the present battery caustic alkaline electrolytes having weaker solution strengths than is normally used. The normal solution strength is 20%, which represents approximately 244 grams of sodium hydroxide per liter of solution and which is known otherwise as being approximately a 6-normal solution. In the present battery, a small decrease in solution strength from the 6-normal value gives marked reduction in the amount of zincate contamination of the electrolyte to enable the battery to discharge higher currents. Whereas, normally, a reduction in solution strength tends to lessen the ampere-hour capacity of the battery, we provide such a large quantity of lime that we are little dependent on a strong alkali solution for maintenance of the ampere-hour capacity. Accordingly, as a generality, we may gain advantages by using solution strengths between 2.5 and 5.5 normal. As a compromise which enables substantial gain in current capacity without substantial loss in ampere-hour capacity there may be used an approximately 5-normal (17%) solution. It is to be observed, however, that aside from discharge rates, temperatures, etc., the solution strength for optimum performance depends also on the size of the battery and the character of the service it is to perform.

In a battery having the overall dimensions of a common No. 6 dry cell there are about 400 cc. of space for lime and electrolyte solution. Upon completely filling the cell with the granular lime which we provide, the cell will yet take about 280 cc. of electrolyte solution—all within the open spaces of the lime mass. The actual volume of the lime is thus about 120 cc., or 30% of the overall volume of the lime mass. The porosity of the lime (in ratio of volume of pores and interstices to volume of its mass) is therefore approximately 230%. This shows the very great area of surface contact which the electrolyte solution has with the lime mass.

The following comparative data may be noted to illustrate the very high performance which is obtainable by our invention. Upon adding a 17% electrolyte solution of caustic soda to the lime-filled cell just above described, the cell will discharge approximately 160 ampere hours. This represents a requirement of about 1.75 cc. of 17% electrolyte solution, and 2.5 cc. of both lime and electrolyte solution, per ampere hour of capacity. In the aforementioned prior-art patent teaching the use of lime having therein a wick type of extender, it is stated that 3 cc. of 20% electrolyte solution are required per ampere hour. This figure excludes the space required for the lime (it being analogous to the 1.75 cc. which we require) and is substantially greater than the space we require for both the lime and the electrolyte. As an illustration of the high current capacity obtainable by our invention, it may be noted that a battery constructed according to our invention having a nominal rating of 860 ampere-hour capacity will, on continual discharge at .7 ampere, deliver 83% of its rating before the voltage falls to .95 volt. In contrast, the prior-art cell, using lime with the extender and having a nominal capacity rating of 750 ampere hours, will under the same conditions deliver substantially less—typically about 65% to 70%—of its rated ampere-hour capacity. It is thus apparent that by our invention we obtain not only a higher ampere-hour capacity per unit of volume of the battery, but also a substantially higher capacity for current discharge.

Any of the caustic alkalis (sodium, potassium and lithium) may be used satisfactorily in the present battery, but it is found that potash has unexpected advantages. It is known that caustic potash will maintain better cell activity at colder temperatures than will the other alkalis. But potash has not been very practical because it has low zinc solubility to give the cell low ampere-hour capacity, and is expensive. However, these inhibiting influences against the use of potash have little application to the present battery because there is here used a minimum amount of electrolyte and this electrolyte is maintained free from zincate contamination by its effective contact with a superabundance of lime. The result is that with the potash there is yet obtained a cell having unusually high ampere-hour capacity together with the ability to discharge high currents at extremely cold temperatures.

We have herein particularly described our invention in terms of a specific preferred embodiment in which the many specific features and aspects of our invention are employed to maximum advantage. It is however to be understood that we intend no unnecessary limitation of our invention to specific details of this embodiment, nor do we intend any unnecessary restriction to the use of the several features of our invention with each other. For example, although it is preferable to use the regenerating material as a mass of loose granules, alternatively the granules may be integrated into a unitary cake while preserving in the main the interstices between granules to maintain the advantages of our invention. Such porous unitary cake may be formed simply by passing the granules as they are formed, and while they are still wet, into a mold and leaving the mass to dry; of course, if such cake is so formed separately of the battery it is to be inserted initially in the container when the battery is assembled. Also, while we preferably completely fill the cell container with granulated regenerating material to obtain maximum performance within a given size of cell, the basic feature of our invention is in using a physical form of regenerating material giving maximum effective contact between it and the electrolyte solution. This form of regenerating material is useful whether or not the cell is completely filled, and no unnecessary limitation to complete filling or to how the regenerating material is contained in the cell is therefore intended. Moreover, the detailed illustration of our invention in terms of lime is not intended as a limitation against the use of other regenerating materials having similar physical character. Such and other modifications of our invention will be apparent to those skilled in the art, and may be made without departure from the scope of our invention, which we endeavor to express according to the following claims.

We claim:

1. In a primary battery of the type comprising a cathode, a metal anode and a caustic alkaline electrolyte solution that tends to become exhausted by substances formed therein during action of the battery: a regenerating mass in said battery comprised predominantly of granules of a material which will react with said substances to release caustic alkali, said mass having open interstices between granules for free passage of electrolyte therethrough, and said granules being permeable to the electrolyte solution and having structural permanence tending to maintain said interstices until all of said regenerating material is reacted with said substances.

2. In a primary battery of the type comprising a cathode, a metal anode and a caustic alkaline electrolyte solution that tends to become exhausted by substances formed therein during action of the battery: a mass of loose granules in said electrolyte for reaction with said substances to release caustic alkali, said mass having open interstices between granules providing open paths for free passage of electrolyte to the individual granules, said granules being composed predominantly of porous lime and containing a finely-dispersed skeleton of a minor proportion of a material adapted to give structural strength and permanence to the granules to maintain said interstices during reaction of the lime with said substances.

3. In a primary battery of the type comprising a cathode, a metal anode and a caustic alkaline electrolyte solution that tends to become exhausted by substances formed therein during action of the battery: a granular mass in said battery comprised predominantly of porous lime, said mass having open interstices between granules for effective flow of electrolyte to individual portions of the entire quantity of said lime, and said granules containing a bonding agent insoluble in said electrolyte solution and chemically non-reactive with said substances.

4. In a primary battery including a container: the combination of cathode and metal anode elements in said container, a mass of granular material substantially filling said container and having open interstices between granules, said material comprising a major proportion of an electrolyte-regenerating ingredient and a minor proportion of another ingredient tending to give structural strength and permanence to said granules during the action of the battery, and a caustic alkaline electrolyte solution contained substantially wholly within said mass.

5. In a primary battery including a container: the combination of cathode and zinc anode elements in said container, a mass of porous, granular lime filling said container substantially to the top of said electrodes, said lime including a minor proportion of a hard, permanent material tending to give physical strength and permanence to the granules thereof, and a caustic alkaline electrolyte solution contained in said granular lime mass and having a solution strength of the order of 5 normal.

6. In an alkaline electrolyte primary battery of the type whose electrolyte tends to become exhausted by substances formed therein during action of the battery: the combination of a container, cathode and anode elements in said container, and a mass of loose, granular material in said container comprising a mixture of a minor proportion of a dry, soluble alkaline electrolyte and a major proportion of a granulated regenerating ingredient reactive with said substances to release electrolyte, said mass having open interstices between granules providing paths for free flow of liquid therethrough so that upon addition of water to said mass said dry electrolyte is dissolved readily to activate the battery, and said electrolyte-regenerating ingredient being permeable to the dissolved electrolyte and having substantial structural permanence during action of the battery to maintain substantially the interstices between the granules.

7. In a primary battery adapted to be activated by the addition of water thereto: the combination of a container, cathode and zinc anode elements in said container, and a porous, granulated mass substantially filling the remaining space in said container and having open spaces between granules, said mass comprising a mixture of lime and dry caustic alkali.

8. A primary battery comprising cathode and zinc anode elements, a caustic alkaline electrolyte solution that tends to become exhausted by compounds of the anode element, and a granular mass substantially filling the spaces between said cathode and anode elements and comprised predominantly of porous lime having open interstices between granules for diffusion of said electrolyte solution therethrough, said electrolyte solution having a strength in the range between 2.5 and 5.5 normal.

9. In a primary battery including a container, and cathode and zinc anode elements in said container: the combination of a mass of granules comprised predominantly of porous lime, said mass substantially filling the remaining free space in said container and having open interstices between granules, and a solution of caustic potash contained predominantly in the open spaces of said granular mass.

10. A primary battery comprising a container, a caustic alkaline electrolyte solution, cathode and metal anode electrodes contacting said solution, said metal anode electrode tending to react with said alkaline solution to form substances which exhaust the latter; and a porous mass substantially wholly of regenerating material substantially filling said container and reactive with said substances to restore the electrolyte solution, said regenerating mass having multitudinous open interstices running therethrough and said electrolyte solution being confined to the open pores and interstices of said regenerating mass.

LE ROY S. DUNHAM.
ERNEST O. JEGGE.

REFERENCES CITED

The following references are of record in the file of this patent:

UNITED STATES PATENTS

| Number | Name | Date |
| --- | --- | --- |
| 1,497,316 | Askin | June 10, 1924 |
| 1,581,851 | Martus | Apr. 20, 1926 |
| 1,834,250 | Martus | Dec. 1, 1931 |
| 2,180,839 | Schumacher, et al. | Nov. 21, 1939 |
| 2,180,955 | Heise, et al. | Nov. 21, 1939 |